May 1, 1962 J. T. PAYNE 3,032,626
CONTROL APPARATUS
Filed Oct. 21, 1959 6 Sheets-Sheet 1

INVENTOR
JAMES T. PAYNE
BY
ATTORNEY

INVENTOR:
JAMES T. PAYNE
BY
ATTORNEY

May 1, 1962

J. T. PAYNE 3,032,626

CONTROL APPARATUS

Filed Oct. 21, 1959

INVENTOR:
JAMES T. PAYNE

BY

ATTORNEY

INVENTOR
JAMES T. PAYNE
BY Roy E. Raney
ATTORNEY

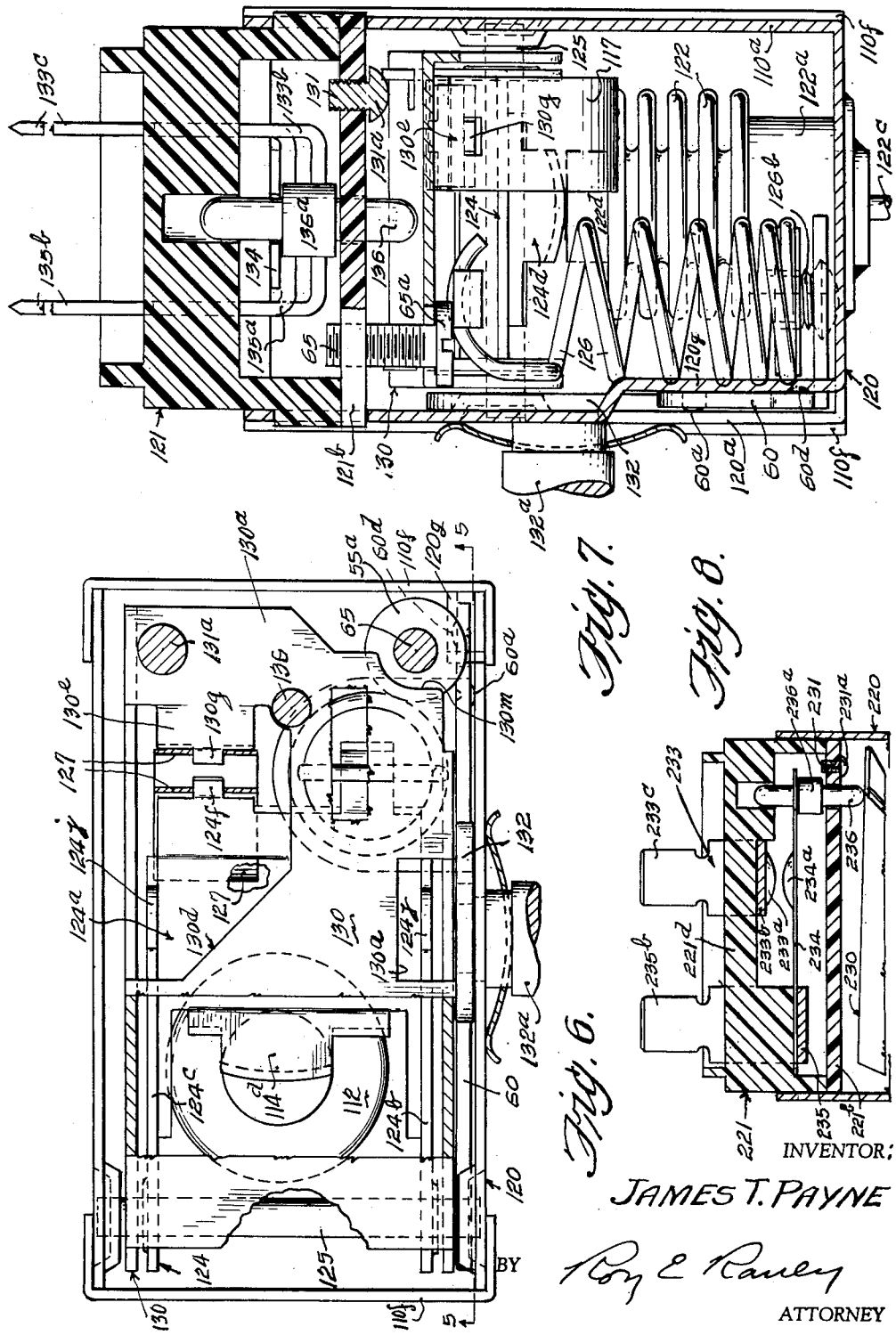

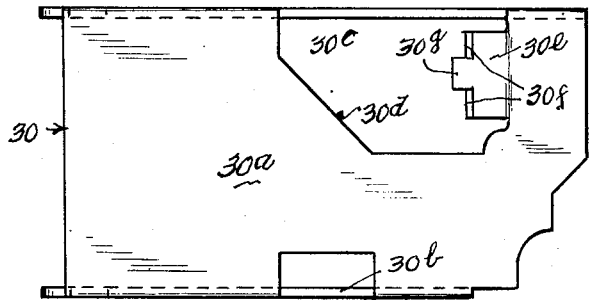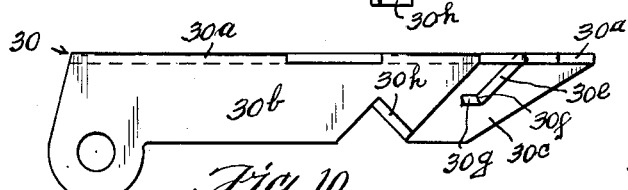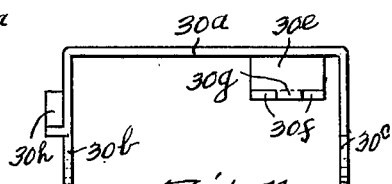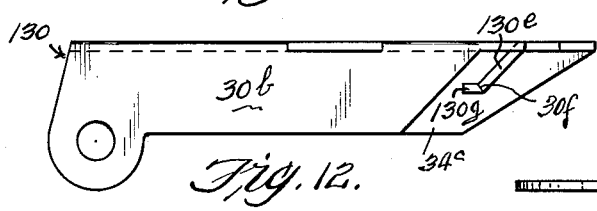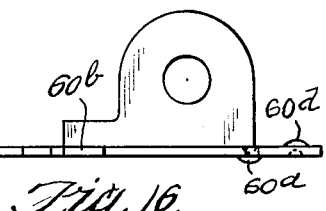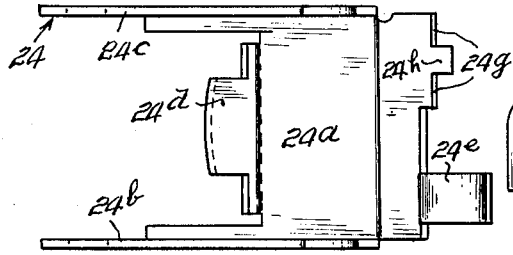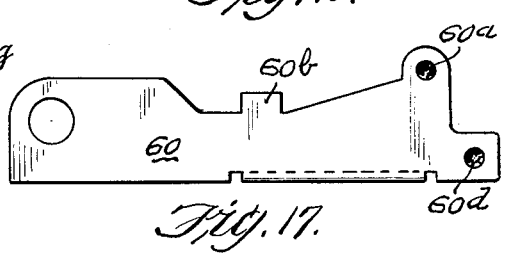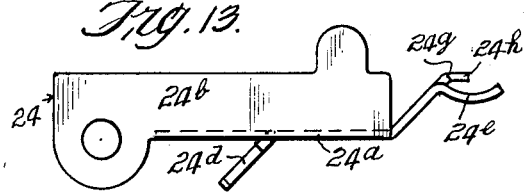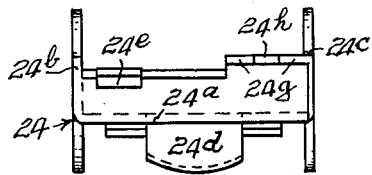

United States Patent Office 3,032,626
Patented May 1, 1962

3,032,626
CONTROL APPARATUS
James T. Payne, Fort Lauderdale, Fla., assignor to Ranco Incorporated, Columbus, Ohio, a corporation of Ohio
Filed Oct. 21, 1959, Ser. No. 847,736
5 Claims. (Cl. 200—83)

The present invention relates to pressure responsive control apparatus of the type suitable for controlling electrically powered equipment according to pressure changes, such as electric motor driven refrigerating systems.

The principal object of the invention is the provision of a control apparatus of the type mentioned in which a pressure responsive element actuates a control device, such as an electric switch, through the medium of two co-extending levers having a common pivot and which are inter-connected by an over-center or toggle spring in such manner that one lever is snap actuated to operate the switch by predetermined movement of the other lever which is moved according to the pressure in the pressure responsive element. The arrangement of the two levers is such that they provide a compact switch operating structure whereby the control apparatus can be enclosed in a relatively small housing, permitting the control to occupy a minimum of space as compared to prior control apparatus for similar purposes. Furthermore, the lever structure enables common parts or similar parts to be utilized to provide control apparatuses having different operating characteristics. For example, by limiting the movement of the switch operating lever in one direction by a manually adjusted cam, a control apparatus may be provided having one pressure limit of switch operation fixed or constant while the other limit of operation is adjustable by manual setting of the cam. In another form, the limit of movement of the switch operating lever in opposite directions is fixed while the loading of the power element may be varied to shift the range of pressure at which the switch is operated while maintaining the differential constant between switch operating pressures.

Other objects and advantages of the invention will be apparent from the following description of preferred forms thereof, reference being made to the accompanying drawings wherein FIG. 1 is a sectional view of a control apparatus embodying the invention and which is particularly suitable for controlling the compressor of a refrigerating system, the section being taken substantially along line 1—1 of FIG. 3;

FIG. 6 is a view taken substantially along line 6—6 of FIG. 5;

FIG. 7 is a view taken substantially along line 7—7 of FIG. 5;

FIG. 8 is a fragmentary sectional view of an alternative form of switching mechanism which may be used in either control apparatus;

FIG. 9 is a top plan view of an actuating lever;

FIG. 10 is a side view of the lever shown in FIG. 9;

FIG. 11 is a right hand end view of the actuating lever;

FIG. 12 is a modified form of actuating lever;

FIG. 13 is a top plan view of a bellows loading lever;

FIG. 14 is a side elevational view of the lever shown in FIG. 13;

FIG. 15 is an end view of the lever shown in FIGS. 12 and 13;

FIG. 16 is a top plan view of a spring adjusting lever; and

FIG. 17 is a side elevation of the lever shown in FIG. 16.

Figure 1:
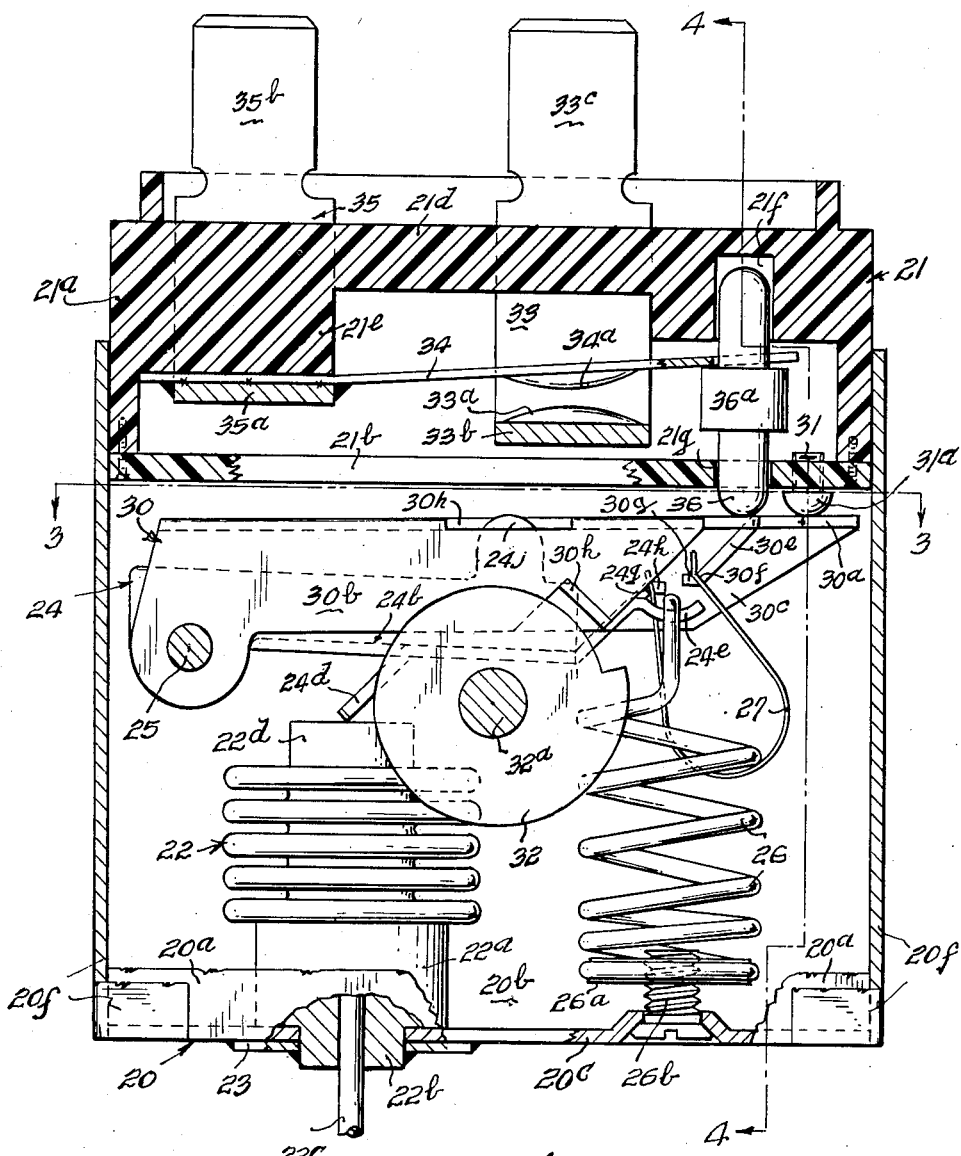

The control apparatus shown in FIGS. 1 to 4 is particularly suitable for closing or "cutting-in" an electric circuit in response to a predetermined relatively high pressure and opening or "cutting-out" the circuit in response to a lower pressure, the "cut-out" pressure being selectable by adjustment of a knob within a given range without affecting the "cut-in" pressure. This type of control is useful in regulating operation of mechanical refrigeration systems in which the control may be effected by pressures within the system or by vapor pressures of a fluid within a bulb subjected to the temperature of the area to be tempered, as is well understood tin the art.

Referring to FIGS. 1 through 4, and 9 through 15, the control apparatus shown comprises a U-shaped frame 20 formed of sheet metal having two opposed side walls 20a and 20b interconnected by a yoke or bottom wall 20c. The side of the frame opposite wall 20c is closed by the body casing 21 of an electric switch arranged to be actuated by mechanism supported within frame 20, described more fully hereinafter. The mechanism within frame 20 comprises an expansible power element 22, which is a metallic bellows and includes a cylindrical base 22a attached to wall 20c by a neck portion 22b projecting through an opening in the bottom wall and staked or brazed to a retaining ring 23 through which it projects, the ring being brazed to the outside of the wall. A capillary tube 22c is attached to base 22a and communicates with the interior of the bellows, and the tube may have a bulb on the end thereof not shown, and the bellows, tube and bulb contain a vapor of a suitable thermo-responsive fluid so that the pressure within the bellows corresponds to the pressure-temperature curve of the fluid at the coolest portion of the vapor system, which, in use, is generally arranged to occur at the bulb. On the other hand, tube 22c could be connected into the low side of the refrigerating system so that the pressure in bellows 22 would correspond to that in the system. A post 22d is formed on element 22 and engages a loading lever 24, described more fully hereinafter, for moving the lever according to the vapor pressure within the bellows.

Figures 3, 4:
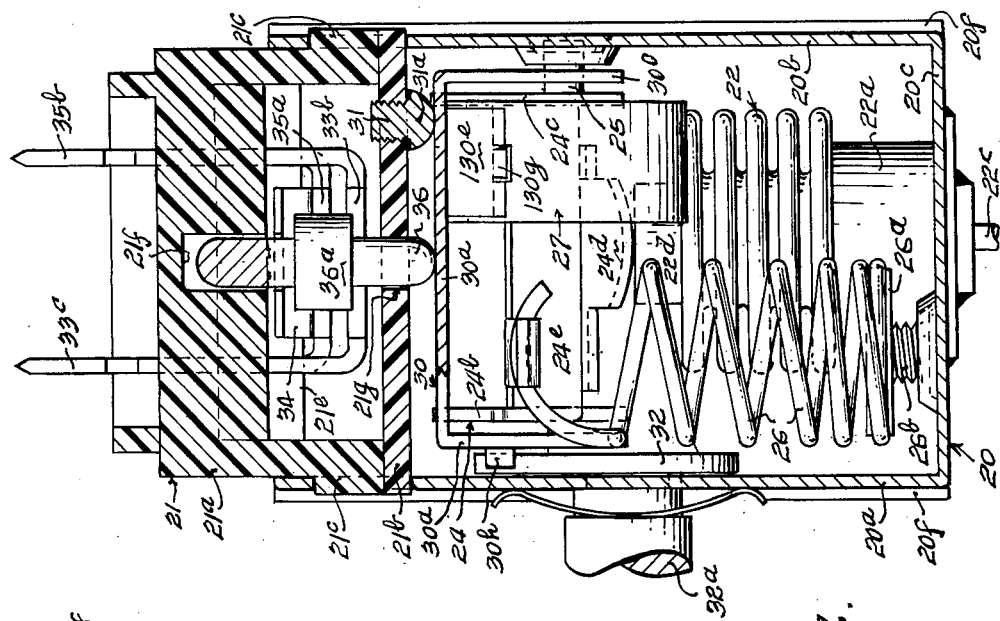
FIG. 3 is a sectional view taken substantially along line 3—3 of FIG. 1.
FIG. 4 is a sectional view taken substantially along line 4—4 of FIG. 1.

Lever 24 comprises, as clearly shown in FIGS. 13, 14 and 15, a sheet metal member having a relatively wide yoke portion 24a and upturned side flanges 24b and 24c which project beyond yoke portion 24a and are cross-drilled and journaled on a pin 25 supported in side walls 20a and 20b of the frame. As viewed in FIGS. 3 and 14, the left hand end of yoke portion 24a has a tongue 24d which is turned downwardly and forms a line point connection between bellows post 22c and lever 24. The right hand end of yoke portion 24a is upturned and has a hook 24e projecting therefrom to which one end of a tension spring 26 is engaged for urging lever 24 clockwise against bellows 22. The edge of the upturned portion of lever 24 along the upper right hand sector, as seen in FIGS. 3 and 13 provides angular bearing edges 24g separated by a tongue 24h which is provided for locating a toggle spring 27 resting on the bearing edges, as explained more fully hereinafter.

As may be seen in FIG. 1, tension spring 26 is attached at its lower end to a nut 26a which is threaded on a screw 26b rotatably supported in an opening in the indented bottom wall 20c of housing 20. The tension of the spring can be regulated during manufacture of the control apparatus by adjusting screw 26b, and normally this adjustment is undisturbed in use.

An actuating lever 30 extends generally parallel to lever 24 and is preferably formed of stamped sheet metal in the shape of an inverted channel having a panel-like section 30a with downturned flanges 30b and 30c, which flanges straddle the side flanges 24b and 24c of lever 24 and are cross-drilled to receive pivot pin 25. As viewed in FIGS. 3 and 10, panel 30a is cut away near the upper right hand quarter to form a generally rectangular opening 30d and the right hand end portion has a lug 30e projecting downwardly to provide angular bearing edges 30f separated by a tongue 30g which projects from the lug 30e intermediate the bearing edges. Bearing edges 30f lie opposite bearing edges 24g and tongue 30g is opposite tongue 24h so as to pivotally support toggle spring 27 therebetween. Spring 27 has V formations adjacent to each end which receives the angular bearing edges 24g and 30f to minimize friction between these parts as pivoting movements occur, and openings in the V formations receive tongues 24h and 30g respectively, to secure the spring in place on the bearings. By this arrangement, as lever 24 is rocked up or down about pin 25, the line of force of spring 27 is shifted from one side to the other of a dead center line which extends through the axial centerline of pin 25 and bearing edges 30f which causes lever 30 to be snap moved upwardly and downwardly by the spring, and this movement of lever 30 is utilized to actuate a switch mechanism described more fully hereinafter.

Upward snap movement of lever 30 is limited by a screw 31 threaded through a cover 21b attached to the open bottom side of the casing 21 of the switching mechanism by screws shown in dotted lines, and the downward movement of the lever is limited by a cam 32, the periphery of which is engaged by a lug 30h formed on one side wall 30b of the lever 30 so as to strike the cam 32 which is journaled on a shaft 32a rotatably supported in an opening through wall 20a of frame 20. The periphery of cam 32 has a sloping portion which provides a variable degree of elevation at which lever 30 is stopped in its downward movement, the purpose of which is explained hereinafter. Preferably, cam 32 is adjustably rotatable by a dial 32b attached to the outer end of shaft 32a.

The switching mechanism operated by lever 30 may be of any suitable design and in the form shown, the switch is contained within the boxlike casing 21 of molded insulating material, such as Bakelite, the bottom side of which is closed by cover 21b mentioned before. The casing is secured in place by external lugs 21c formed thereon which snugly fit into openings in walls 20a and 20b of frame 20, as clearly shown in FIGURES 1 and 4. The switch comprises a fixed contact 33a which is attached to a yoke portion 33b of a U-form terminal member 33, the legs of which are embedded in wall 21d of casing 21, and one leg 33c thereof projects above the wall and forms a spade type terminal connector for attaching the contact in the circuit to be controlled. A leaf spring 34 in anchored at one end to a second U-shaped terminal 35 which has its legs embedded in wall 21d and the yoke portion 35a thereof abutting a step 21e of the wall and to which the left hand end of spring 34 is brazed. Leg 35b of terminal 35 projects above wall 21d and beyond the other leg to form a spade type terminal by which contact spring 34 may be connected in the circuit to be controlled. A contact 34a is attached adjacent to the right hand end of spring 34 and the spring normally urges this contact into engagement with contact 33a to thus close a circuit between terminals 33c and 35b. The spring contact is adapted to be raised by lever 30 to separate the contacts through a pin 36, which is formed of a suitable dielectric material, and is arranged to be guided by the walls of openings 21f and 21g formed in wall 21d and cover 21b of casing 21 and received through a notch in the right hand end of the spring. Pin 36 includes an enlarged section 36a which engages the underside of contact spring 34 and, as may be seen in FIG. 2, when lever 30 is resting against cam 32, pin 36 drops to permit contact 34a to engage contact 33a. When lever 30 is in its raised position, as shown in FIG. 1, it drives pin 36 upwardly moving spring arm 34 to separate contact 34a from 33a.

Preferably, the ends of the U-shaped frame are closed by sheet metal covers 20f respectively, which may be frictionally held in place, as by detents, not shown.

Figure 2:
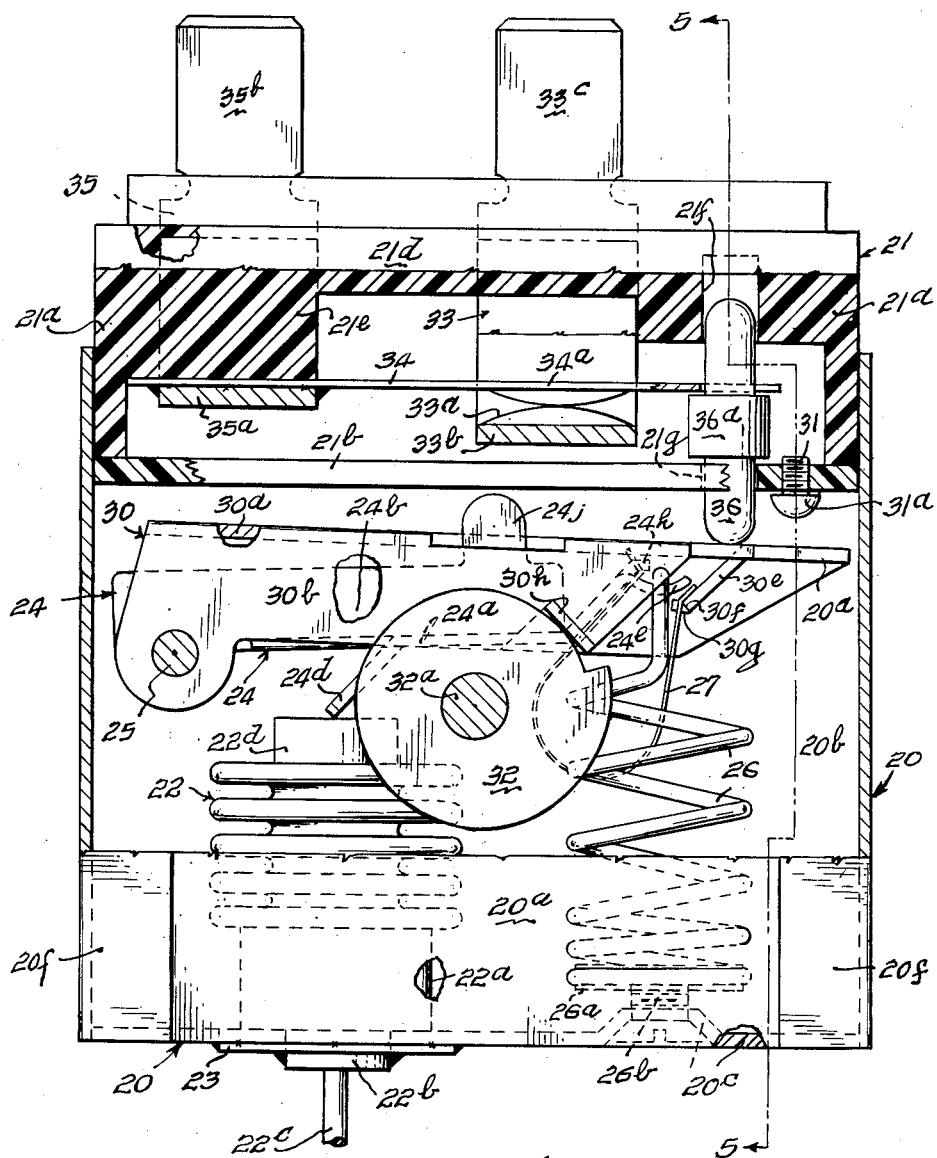
FIG. 2 is a view similar of FIG. 1 but showing certain parts of the apparatus in different positions.

Operation of the control apparatus is as follows: Referring to FIG. 1, assuming that the control apparatus is to control the motor of a refrigerating system, not shown, terminals 33c and 35b are series connected in the electric motor circuit by suitable terminal leads, not shown, and that the temperature of the refrigerator is at or below that desired, the pressure within power element 22 is relatively low so that the tension of spring 26 moves lever 24 to its lower position in which the left hand side of toggle spring 27 is below the dead centerline mentioned, thereby causing the spring to snap urge lever 30 to its raised position in which contacts 34a and 33a are separated. As the temperature in the refrigerator increases, the pressure within power element 22 likewise increases until it reaches the point at which it overcomes the tension of spring 26 and moves lever 24 slightly above the dead center position of spring 27, thereby causing the spring to shift its force and snap move lever 30 downwardly bringing lug 30h into engagement with the periphery of cam 32. This movement causes pin 36 to drop downwardly thereby permitting contact spring 34 to engage contact 34a on contact 33a, as shown in FIG. 2, thereby completing the circuit through the switch and initiating operation of the refrigerating system.

It will be observed that the lower position of lever 30 and consequently the elevation of toggle pivot points relative to pivot points 24g and 30f, is determined by the rise of cam 32 at the particular angular setting of the cam at which lug 30h engages the cam, and as this position of lever 30 is lowered, lever 24 must descend an additional amount by further collapse of bellows 22 to bring toggle pivot points 24g below the dead centerline position thereby requiring the refrigerating equipment to reach a lower temperature before toggle spring 27 is operative to snap lever 30 in its raised position and interrupt the compressor motor circuit.

The uppermost position of lever 30 and consequently toggle pivot 30f, is controlled by the head 31a of the stop screw 31 and the higher this position the greater must be the pressure developed in bellows 22 to move lever 24 to the snap-over point for toggle spring 27 to cause the switch to be closed. It will be seen that in normal operation, the setting of stop 31 is inaccessible to the user; however, cam 32 may be readily rotated by knob 32b to alter the lower limited position of lever 30 so that the user of the refrigerating system can readily adjust the cut-out temperature by the cam rotating dial 32b to change the average temperature without altering the "cut-in" temperature setting. This is desirable where the refrigerating cycles should include a defrost period.

If desired, the contour of cam 32 can be formed so that lug 30h and therefore lever 30 can be raised to a point at which the lever maintains switch contacts 33a and 34a open regardless of the extent of movement of lever 24 by the bellows.

To prevent lever 24 from moving lever 30 to the switch opening position due to an abnormally high pressure in bellows 22, lever 24 has lugs 24j formed thereon which project through openings 30d and 30f of lever 30 and engage cover 21b to positively limit lever 24 in its counterclockwise movement in a spaced relation to lever 30 to prevent switch opening movement of the latter.

Figure 5:
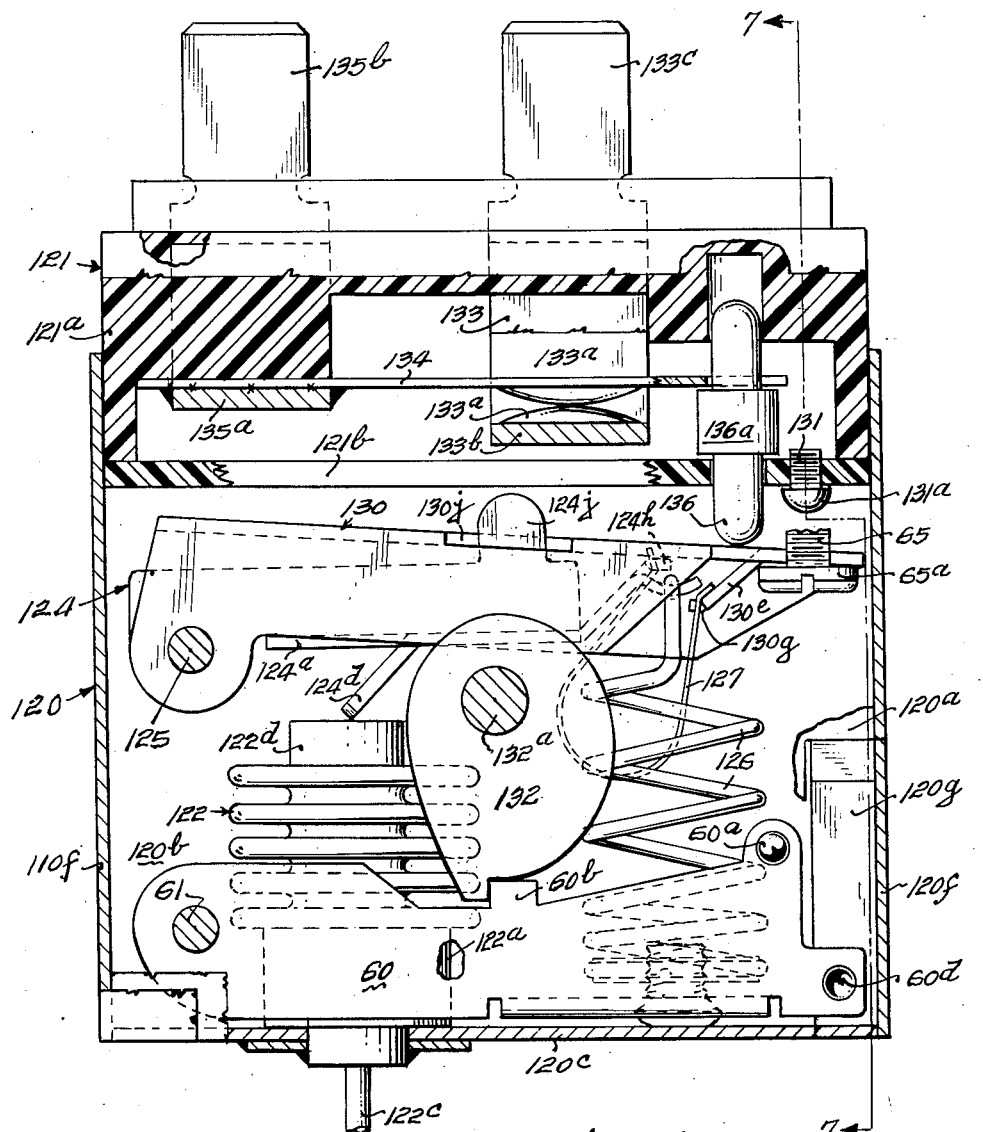
FIG. 5 is a sectional view of a control apparatus embodying a second form of the invention, the view being taken substantially along line 5—5 of FIG. 6.

Referring to the form of the invention shown in FIGS. 5 through 7, most parts are the same as those described with reference to the embodiment shown in FIGS. 1 through 4, and such parts are indicated by the same reference characters but having a prefix "1." In this form of the invention, the tension of loading spring 126 can be adjusted by cam 132 and the limits of swinging movement of actuating lever 130 are factory set and remain fixed during normal service of the control. Thus, the differential between cut-in and cut-out pressures remains constant while the range of pressures at which the control operates may be shifted by the user. As is apparent from FIG. 6, spring 126, which loads lever 124, is attached at its lower end to a lever 60 which is pivoted on a pin 61 journaled in the opposite side walls of housing 120. Screw 126b is rotatably supported in an opening through a laterally extending flange 60a formed on lever 60 and is operative to provide an initial tension to spring 126 for calibrating the control. Spring 126 urges lever 124 upwardly and causes a lug 60b formed thereon to ride on the periphery of cam 132. In the form shown, lever 60 is stabilized against lateral stresses by dimples 60a and 60d formed therein which provide low friction bearings which engage the inside of wall 120a and the outer face of an indented strip 120g formed on wall 120a. It will be seen that the length of spring 126, and consequently its tension on lever 124, can be manually adjustable by rotating the knob attached to shaft 132a thereby varying the load placed on power element 122 and correspondingly changing the pressures at which the switch mechanism is actuated through levers 124 and 130 in a manner similar to that described with reference to levers 24 and 30. It should be noted that the contour of cam 132 is not necessarily the same as the contour of cam 32 and that the contours of each will depend upon the operating characteristics desired. In the form of the invention under discussion, lever 130 is modified over lever 30 to the extent that the cam riding lug 30h as shown in FIG. 10, is eliminated and the downward movement of lever 130 is limited by engagement with the head 65a of a screw 65 threaded into the cover 121b, lever 130 being cut away as at 130m to accommodate the shank of the screw as shown in FIG. 6. Upward movement of lever 130 is limited by the head 131a of screw 131 which is adjustably threaded into partition wall 121b. By this construction, the angle through which lever 130 is oscillated to actuate the switching mechanism is fixed by screw adjustments so that during normal operation, the only adjustment available is that of changing the loading of spring 126 on lever 124, as described. Since the two positions of lever 124 at which lever 130 is snap actuated by spring 127 to actuate the switch mechanism are fixed by stops 65a and 131a, the differential in pressure inside bellows 122 to actuate the switch from one position to the other remains constant throughout the range of operation as determined by spring 126.

It will be seen that by arranging the bellows loading levers 24 and 124 so that they are straddled by the levers 30 and 130, respectively, and forming these levers to receive a toggle spring therebetween as described, an extremely simple and compact switch operated control structure is provided. This construction permits the use of common parts, such as levers 24 and 30, switch mechanisms and frames, to provide control apparatus having one pressure or temperature limit fixed while the other limit is variable, or both limits can be changed over a range of adjustment. The adjustments in either case can be readily effected through the cam attached to the control housing adjacent to the lever system.

In the event it is desirable to reverse the responsiveness of the switch in either of the two described control apparatuses, i.e., to close in response to a decrease in pressure instead of opening, switching mechanism 221 (see FIG. 8) can be substituted for mechanism 21 or 121. Mechanism 221 is similar to mechanism 21 with the exception that terminal 233 has the yoke portion 233b thereof lying against the wall 221d which corresponds to wall 21d, in FIGS. 1 and 3, and 121d in FIG. 5 and contact 233a is secured to the bottom side of the yoke rather than the upper side, as is contact 33a. Contact spring 234 is similar to contact spring 34 except that its contact 234a is on the top side thereof so as to engage contact 233a when spring 234 is forced upwardly by pin 236. It will be seen that by this arrangement the contact action is reversed from that described with reference to the embodiments shown in FIGS. 1 through 7, and that this reversal operation can be easily effected by merely substituting switch mechanisms in frame 20.

While I have described but several forms of the invention, it is understood that other modifications, adaptations and changes could be effected all falling within the scope of the claims which follow.

I claim:

1. Control apparatus comprising, a U-shaped sheet metal frame, a control device supported across the open end of said frame by the outer end portions of the sides of said frame, first and second channel shape sheet metal levers arranged with the side flanges of one straddling the side flanges of the other and with yoke portions thereto lying generally in opposed spaced relation, a common pivot pin supported by said frame and extending through aligned openings through said side flanges, said yoke portion of the first lever having an edge forming an angular bearing surface, said yoke portion of the second lever having an edge forming an angular bearing surface disposed in spaced opposed relation with the first mentioned edge, a compression spring supported by said bearing surfaces for urging said levers about said pivot pin in opposite directions, loading means to bias one of said levers in one direction about its pivot, a pressure responsive element supported by the yoke wall of said frame and operative to move said one lever in opposition to said loading means, means to limit movement of the other of said levers about its pivot, and means operatively interconnecting the last mentioned lever with said control device.

2. Control apparatus comprising, a U-shaped sheet metal frame, a control device supported across the open end of said frame by the outer end portions of the sides of said frame, first and second channel shape sheet metal levers arranged with the side flanges of one straddling the side flanges of the other and with yoke portions thereto lying generally in opposed spaced relation, a common pivot pin supported by said frame and extending through aligned openings through said side flanges, said yoke portion of the first lever having an edge forming an angular bearing surface, said yoke portion of the second lever having an edge forming an angular bearing surface disposed in spaced opposed relation with the first mentioned edge, a compression spring supported by said bearing surfaces for urging said levers about said pivot pin in opposite directions, loading means to bias one of said levers in one direction about its pivot, a pressure responsive element supported by the yoke wall of said frame and operative to move said one lever in opposition to said loading means, a cam rotatably supported on a side wall of said frame and adjacent to the other of said levers and to be engaged by the last mentioned lever to limit the movement thereof in one direction about its pivot, and means operatively interconnecting said last mentioned lever with sand control device.

3. Control apparatus comprising, a U-shaped sheet metal frame, a control device supported across the open end of said frame by the outer end portions of the sides of said frame, first and second channel shape sheet metal levers arranged with the side flanges of the other and with yoke portions thereto lying generally in opposed spaced relation, a common pivot pin supported by said frame and extending through aligned openings through said side flanges, said yoke portion of the first lever having an edge forming an angular bearing surface, said yoke portion of the second lever having an edge forming an angular bearing surface disposed in spaced opposed relation with the first mentioned edge, a compression spring supported by said bearing surfaces for urging said levers about said pivot pin in opposite directions, loading means to bias said first lever in one direction about its pivot and comprising a third lever pivoted to said frame, a loading spring interconnecting said first and third levers, a cam rotatably pivoted on a side wall of said frame, said third lever being biased by said loading spring against the cam surface of said cam, a pressure responsive element supported by the yoke wall of said frame and operative to move said first lever in opposition to said loading means, means to limit movement of the other lever about its pivot, and means operatively interconnecting said second lever with said control device.

4. Control apparatus comprising, a U-shaped frame member including two side walls and an interconnecting yoke wall, switching means supported by said side walls opposite said yoke wall to close the side of said frame opposite said yoke wall, first and second coextending levers in straddling relationship within said frame, means to pivot said levers at one end thereof, said first lever having bearing edges extending along an edge portion thereof and said second lever having bearing edges disposed in opposed spaced relationship with the bearing edges of said first levers, a compression spring supported by said bearing edges for urging said levers in opposite directions about their pivots, a spring biasing said first lever in one direction about its pivot, a pressure responsive element supported on said interconnecting wall and engaging said first lever to move said first lever about its pivot in opposition to said spring, a cam rotatably attached to one of said side walls, said second lever having a part thereof arranged to engage said cam to limit movement of said lever in one direction about its pivot, and means interconnecting said second lever with said switching means.

5. Control apparatus comprising, a U-shaped frame member including two side walls and an interconnecting yoke wall, switching means supported by said side walls opposite said yoke wall to close the side of said frame opposite said yoke wall, first and second coextending levers in straddling relationship within said frame, means to pivot said levers at one end thereof, said first lever having bearing edges extending along an edge portion thereof and said second lever having bearing edges disposed in opposed spaced relationship with the bearing edges of said first levers, a compression spring supported by said bearing edges for urging said levers in opposite directions about their pivots, a loading spring biasing said first lever in one direction about its pivot, a third lever pivoted on said frame and connected with said loading spring, a cam rotatably supported on a side wall of said frame and engaged by said third lever for shifting the latter when said cam is rotated, a pressure responsive element supported on said interconnecting wall and engaging said first lever to move said first lever about its pivot in opposition to said spring, means to limit movement of said lever in opposite directions about its pivot, and means interconnecting said second lever with said switching means.

References Cited in the file of this patent

UNITED STATES PATENTS

| | | |
|---|---|---|
| 2,125,095 | Zurcher | July 26, 1938 |
| 2,151,238 | Shaw | Mar. 21, 1939 |
| 2,255,666 | Judson | Sept. 9, 1941 |
| 2,255,667 | Judson | Sept. 9, 1941 |
| 2,298,795 | Judson | Oct. 13, 1942 |
| 2,889,432 | Miller | June 2, 1959 |